United States Patent [19]

Nakazato

[11] Patent Number: 5,625,741
[45] Date of Patent: Apr. 29, 1997

[54] VIDEO SIGNAL RECORDING APPARATUS

[75] Inventor: Saburo Nakazato, Yokohama, Japan

[73] Assignee: Canon Kabushiki Kaisha, Tokyo, Japan

[21] Appl. No.: 289,223

[22] Filed: Aug. 12, 1994

Related U.S. Application Data

[63] Continuation of Ser. No. 877,977, May 4, 1992, abandoned.

[30] Foreign Application Priority Data

May 10, 1991 [JP] Japan ................... 3-133242

[51] Int. Cl.$^6$ .................... H04N 5/76
[52] U.S. Cl. ............. 386/120; 386/117
[58] Field of Search ............ 358/335, 310, 358/906, 909.1; 360/35.1, 33.1; 348/320, 322; 386/120, 117; H04N 5/76, 5/77

[56] References Cited

U.S. PATENT DOCUMENTS

| | | | |
|---|---|---|---|
| 4,599,657 | 7/1986 | Kinoshita et al. | 358/335 |
| 4,602,289 | 7/1986 | Sekine | 358/213.22 |
| 4,604,668 | 8/1986 | Lemelson | 360/10.1 |
| 4,858,032 | 8/1989 | Okada et al. | 358/310 |
| 4,930,006 | 5/1990 | Murayama et al. | 358/44 |
| 5,202,798 | 4/1993 | Takei et al. | 360/35.1 |
| 5,260,776 | 11/1993 | Taguchi et al. | 358/906 |

FOREIGN PATENT DOCUMENTS

| | | |
|---|---|---|
| 0395059 | 10/1990 | European Pat. Off. . |
| 59-072283 | 4/1984 | Japan . |
| 60-201657 | 10/1985 | Japan . |
| 63-287181 | 11/1988 | Japan . |

*Primary Examiner*—Thai Q. Tran
*Assistant Examiner*—Huy Nguyen
*Attorney, Agent, or Firm*—Fitzpatrick, Cella, Harper & Scinto

[57] ABSTRACT

A video signal recording apparatus having: an image pickup sensor having a plurality of pixels two-dimensionally disposed by a predetermined interval in horizontal and vertical directions, pixels being shifted alternately for each horizontal line; a recording circuit for recording a signal read by the image pickup sensor on a recording medium; a switch member for instructing which one of a moving image and a still image is to be generated; and a control circuit for controlling generation of one of the moving image and the still image in accordance with an instruction by the switch member, wherein upon an instruction of the moving image, pixel signals on two adjacent horizontal lines of the image pickup sensor are read in a zigzag manner as first field signals, and pixel signals on two adjacent horizontal lines shifted in the vertical direction from the first-mentioned two adjacent horizontal lines are read in the zigzag manner as second field signals, the first and second field signals being recorded on the recording medium, and wherein upon an instruction of the still image, the first field signals are read and recorded in the recording medium and temporarily stored in a memory, and after reading the first field signals, the first field signals stored in the memory are read as the second field signals and read and recorded in the recording medium.

5 Claims, 3 Drawing Sheets

VIDEO SIGNAL RECORDING APPARATUS

This application is a continuation of application Ser. No. 07/877,977 filed May 4, 1992, now abandoned.

BACKGROUND OF THE INVENTION

1. Field of the Invention

The present invention relates to a video signal recording apparatus for converting an optical image of a subject into electric signals and recording them on recording medium.

2. Related Background Art

Video signals recorded on a video tape recorder or the like are printed in many cases, as video printers have become widely available. In recording moving images taken by a video camera on a video tape recorder, an interline type CCD image pickup sensor obtains image signals of one frame by reading two adjacent lines shifted in the vertical direction and combining first and second field signals shifted in the vertical direction.

However, with such a conventional method, a frame image is printed out with blur at the moving image area. It is therefore necessary to print a moving image area by using a field image, degrading the image quality. In order to prevent an image quality from being degraded, it is necessary to take an image of a subject in a still state.

SUMMARY OF THE INVENTION

The present invention has been made to solve the above problem. It is therefore an object of the present invention to provide a video signal recording apparatus capable of printing a still image of high quality.

In order to achieve the above object of the present invention, there is provided a video signal recording apparatus comprising: image pickup means having a plurality of pixels two-dimensionally disposed by a predetermined interval in horizontal and vertical directions, pixels being shifted alternately for each horizontal line; recording means for recording a signal read by the image pickup means on a recording medium; means for instructing which one of a moving image and a still image is to be generated; and means for controlling generation of one of the moving image and the still image in accordance with an instruction by the instructing means, wherein upon an instruction of the moving image, pixel signals on two adjacent horizontal lines of the image pickup means are read in a zigzag manner as first field signals, and pixel signals on two adjacent horizontal lines shifted in the vertical direction from the first-mentioned two adjacent horizontal lines are read in the zigzag manner as second field signals, the first and second field signals being recorded on the recording medium, and wherein upon an instruction of the still image, the first field signals are read and recorded in the recording medium and temporarily stored in a memory, and after reading the first field signals, the first field signals stored in the memory are read as the second field signals and read and recorded in the recording medium.

The other objects and advantages of the present invention will become more apparent from the following description and accompanying drawings.

DETAILED DESCRIPTION OF THE PREFERRED EMBODIMENTS

Figure 1:
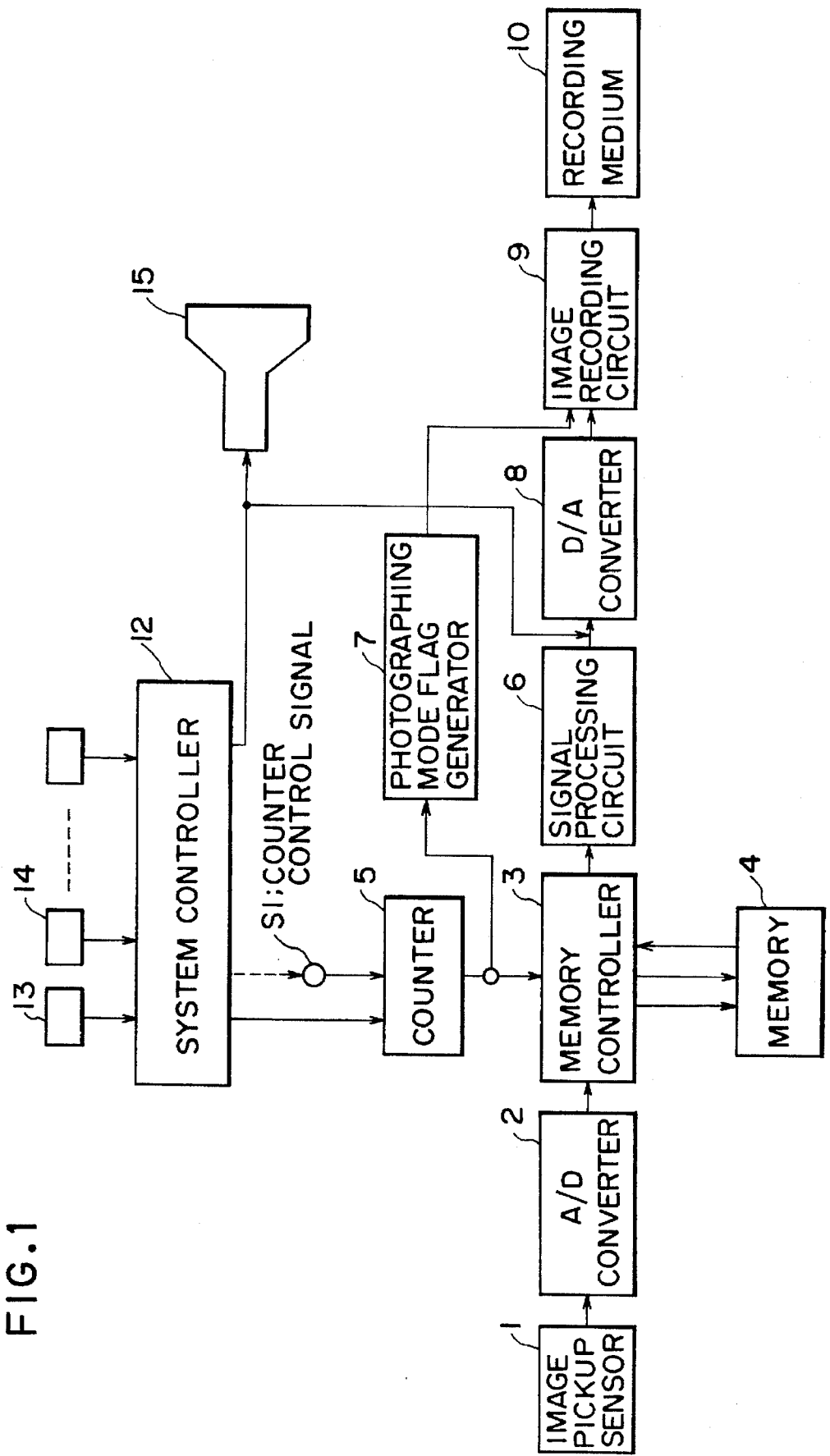
FIG. 1 is a block diagram showing an embodiment of a video signal recording apparatus according to the present invention.

Preferred embodiments of the present invention will be described with reference to the accompanying drawings. FIG. 1 is a block diagram showing an embodiment of a video signal recording apparatus.

In FIG. 1, reference numeral 1 represents an image pickup sensor using CCDs for example for converting a subject image into electric signals. Reference numeral 2 represents an A/D converter for converting a signal from the image pickup sensor 1 into a digital signal. The image pickup sensor 1 uses a MOS type image sensor whose particular structure will be detailed later. Reference numeral 3 represents a memory controller, reference numeral 4 represents a memory for storing digital signals from the A/D converter 2 under control of the memory controller 3, and reference numeral 5 represents a counter used for designating an operation mode. The memory controller 3 and memory 4 are interconnected by a control line and signal lines via which data is read from and written into the memory 4. The counter 5 is inputted with a control signal S1 from a system controller 12. In response to this control signal S1, the counter 5 outputs a pulse signal of a predetermined frequency to the memory controller 3 and to a photographing mode flag generator 7. In response to the pulse signal from the counter 5, an operation mode is switched between a moving image mode and a still image mode, as will be later described in detail. Reference numeral 6 represents a signal processing circuit for processing digital signals corresponding to signals sensed by the image pickup sensor 1, reference numeral 8 represents a D/A converter for converting a digital output from the signal processing circuit 6 into an analog signal, and reference numeral 9 represents an image recording circuit. An output signal from the signal processing circuit 6 is converted into an analog signal by the D/A converter 8, and sent to the image recording circuit 9 to subject it to a predetermined process and store it on a recording medium 10. The recording medium 10 for recording an output from the image recording circuit 9 may use an optical disk for example.

The system controller 12 shown in FIG. 1 controls various circuit portions of this apparatus, and has various switches including a mode setting switch 13 for setting the moving image photographing mode or still image photographing mode, and a time setting switch 14 for setting a count time of the counter 5.

The mode set by the mode setting switch 13 is displayed on display means such as an electronic view finder 15.

Figure 2:
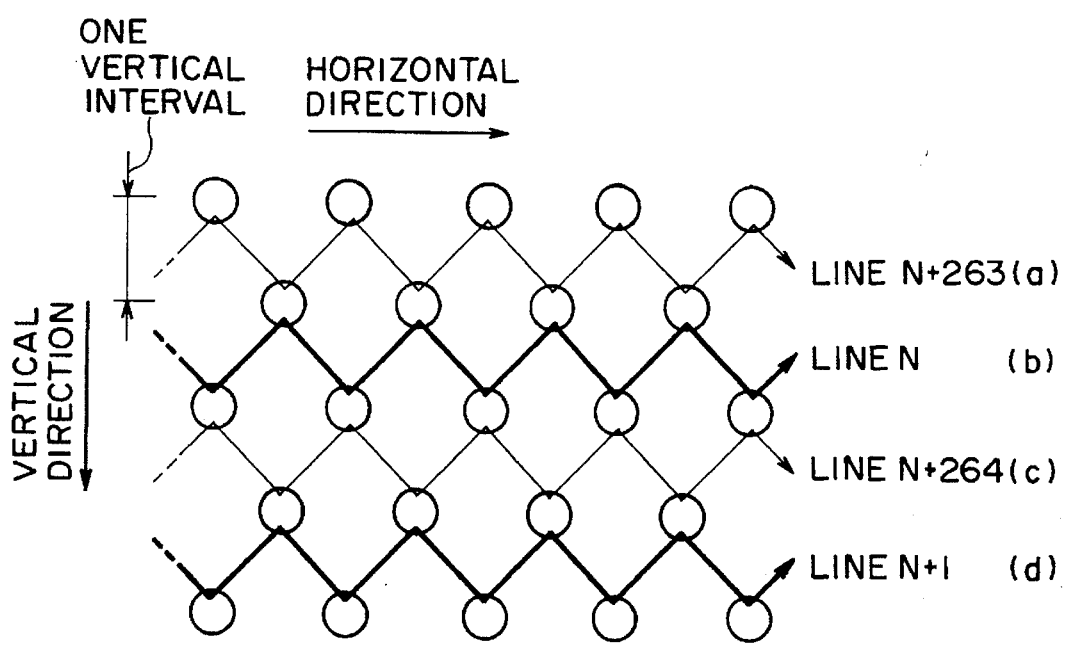
FIG. 2 is a diagram showing a layout of pixels of an image pickup sensor.

FIG. 2 is a diagram showing a layout of pixels of the image pickup sensor 1, wherein circles represent pixels. As shown in FIG. 2, pixels are disposed at a predetermined interval in the horizontal direction and in the vertical direction. Pixels on each horizontal line are shifted from those on adjacent horizontal lines. Specifically, each pixel on a horizontal line shown in FIG. 2 is positioned at the center of two pixels on the next horizontal line. The image pickup sensor 1 of this embodiment reads pixel signals in the following manner. Pixel signals on two adjacent lines are read in a zigzag manner to obtain first field signals as indicated by (b) and (d) in FIG. 2, and to obtain second field signals as indicated by (a) and (c) in FIG. 2. In this manner, one frame image is obtained.

The operation of the embodiment will be described. In the moving image mode, the counter 5 stops its count operation in response to an instruction from the system controller 12 set by the mode setting switch 13. In this mode, the counter 5 outputs a low level signal to the memory controller 3 and photographing mode flag generator 7. Then, the memory controller 3 operates to output pixel signals sensed by the image pickup sensor 1 and A/D converted by the A/D converter 2 to the signal processing circuit 6. In this case, pixel signals from the image pickup sensor 1 are alternately read as the first and second field signals as described with FIG. 2. Pixel signals read in a zigzag manner from the image pickup sensor 1 are corrected by the signal processing circuit 6 to generate an image signal for the moving image mode. An output signal from the signal processing circuit 6 is converted into an analog signal by the D/A converter 8, and sent to the image recording circuit 9 and recorded on the recording medium 10.

Next, the operation during the still image mode will be described. In the still image mode, the counter 5 is set with a counter time in response to the counter control signal S1 from the system controller 12. In response to the control signal S1, the counter 5 outputs a high level signal at a predetermined time interval to the memory controller 3 and photographing flag generator 7. In response to the high level signal, the memory controller 3 operates to read data of all pixels sensed by the image pickup sensor 1, in the manner that the first field signals are read as indicated at (b) and (d) in FIG. 2, and to supply them to the signal processing circuit 6. At the same time, the memory controller 3 operates to temporarily store the first field signals in the memory 4. The first field signals supplied to the signal processing circuit 6 are subject to a predetermined process, and thereafter are recorded on the recording medium 10. After recording the first field signals, the memory controller 3 operates to read the first field data stored in the memory 4, and to send it to the signal processing circuit 6 and record it on the recording medium 10. In reading one field data from the memory 4, the memory controller 3 changes the order of reading first field data in the manner that the data is read as indicated at (a) and (c) in FIG. 2, and records the read data on the recording medium 10 via the signal processing circuit 6. In this manner, a frame still image is obtained which is constructed of two fields each read in a different manner from data of all pixels once read by the image pickup sensor 1. In response to the high level signal from the counter 5, the photographing mode flag generator 7 sends a photographing mode flag to the image recording circuit 9 to record it on the recording medium 10. Namely, during the still image mode, the photographing mode flag is recorded on the recording medium 10 to discriminate between the frame still image data and moving image data on the recording medium 10.

As an output of the counter 5 is inverted to the low level, the operation mode returns to the moving image mode. The memory controller 3 operates to generate an image signal for the moving image mode by reading the first and second field signals, and to record them on the recording medium 10, as described above. As the counter 5 outputs a high level signal, the operation mode changes to the still image mode to record a frame still image on the recording medium 10. As described above, in this embodiment, the counter 5 outputs high and low level signals at a predetermined switching interval to switch between the moving and still image modes, generate field moving signals and frame still image signals at the predetermined switching interval, and record them on the recording medium 10. In printing a necessary scene, the frame still image is detected basing upon the photographing mode flag, and the frame still image is printed, providing a high quality still image. Furthermore, snap photographing is possible during the moving image mode, by temporarily switching the operation mode with the mode setting switch and recording a frame still image. In this case, a snap photographing area can be easily found by searching the photographing mode flag.

In the above-described case where the operation of the counter 5 is set by the counter control signal S1 from the system controller 12, if a still image is taken one frame per one to several tens seconds, for example, the moving image photographing is not adversely effected during this still image photographing. If printing is the main purpose, the count of the counter 5 is reduced or all images are taken as frame still images. It is therefore preferable to make variable the time period of generating a still image. Furthermore, as described above, a photographer may take a frame still image temporarily during the moving image mode, like a snap photographing.

Figure 3:
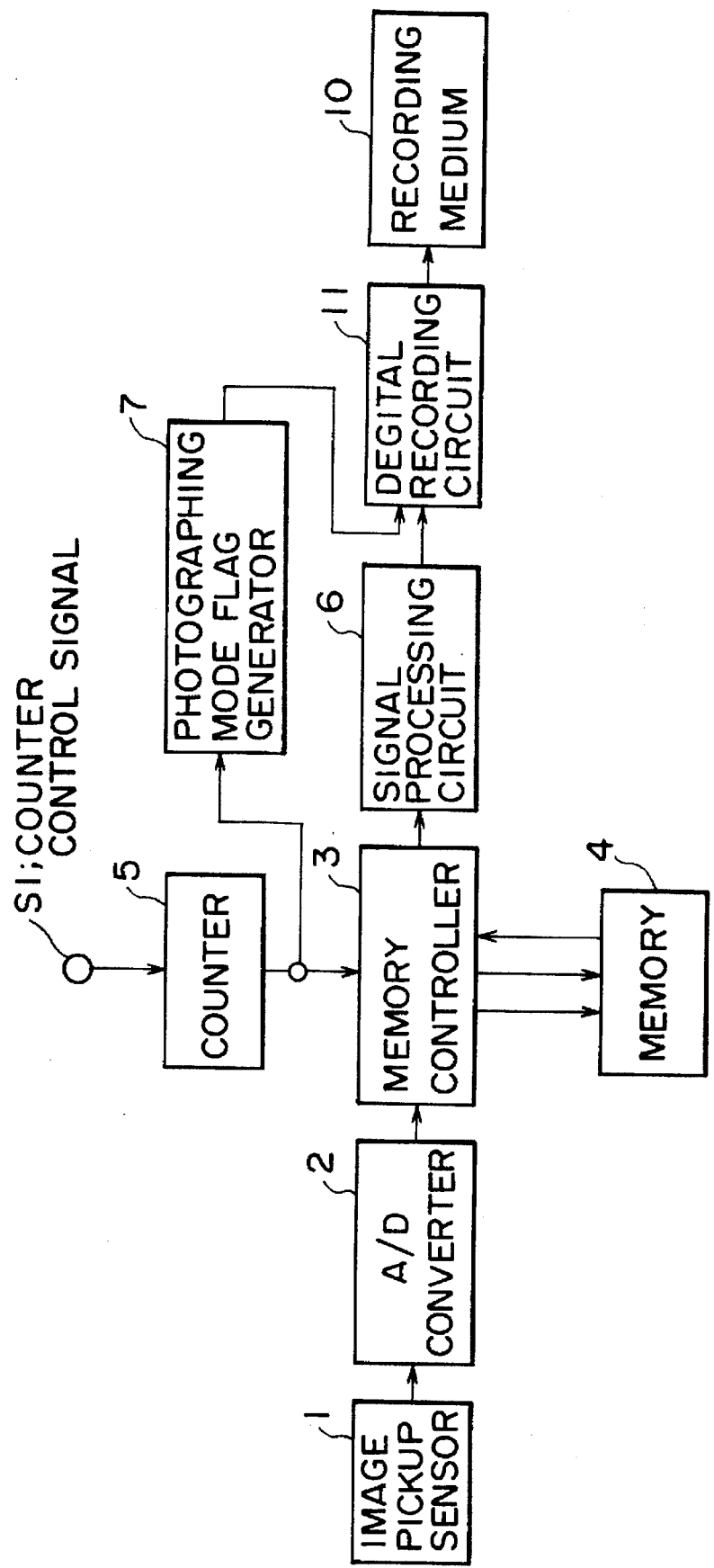
FIG. 3 is a block diagram showing another embodiment of the video signal recording apparatus according to the present invention.

FIG. 3 is a block diagram showing another embodiment of the present invention. In this embodiment, image signals are recorded as digital signals by a digital recording circuit 11 without using the D/A converter 8. The other structure is the same as the first embodiment shown in FIG. 1. This embodiment also provides a still image of high quality same as the first embodiment.

As described so far, the present invention allows to print a still image of high quality without any blur.

What is claimed is:

1. A video signal recording apparatus comprising:
   image pickup means for outputting an image pickup signal, said image pickup means having a plurality of pixels arranged two-dimensionally at a predetermined interval in horizontal and vertical directions, the pixels being arranged so that each group of pixels forming a horizontal line is offset in the horizontal direction from each group of pixels forming an adjacent horizontal line;
   recording means for recording a signal output from said image pickup means;
   a memory;
   instructing means for outputting an instruction indicating which one of a moving image signal and a still image signal is to be generated from the image pickup signal and;
   controlling means for controlling generation of one of the moving image signal and the still image signal in accordance with the instruction from said instructing means, said controlling means controls signal generation so that
   (i) when said instructing means instructs generation of the moving image signal, pixel signals on a first pair of adjacent horizontal lines of said image pickup means are read in a zigzag manner as first field signals and pixel signals on a second pair of adjacent horizontal lines, the second pair including one line from the first pair of lines, are read in the zigzag manner as second field signals, the first and second field signals being recorded by said recording means, and
   (ii) when said instructing means instructs generation of the still image signal, the first field signals are read and recorded by said recording means and are temporarily stored in said memory, and after recording the first field signals, the first field signals stored in the memory are read out of the memory, in a manner that is different from the manner used to read the pixel signals to generate the first field signals, as said second field signals and are recorded by said recording means.

2. A video signal recording apparatus according to claim 1, wherein said instructing means instructs said controlling means to alternately generate the moving image signal and the still image signal at a predetermined time interval so that recorded still image signals are interspersed among recorded moving image signals.

3. A video signal recording apparatus according to claim 1, wherein said instructing means comprises means for setting the time period for generating the still image signal to an optional time period.

4. A video signal recording apparatus according to claim 1, further comprising means for generating a mode signal representative of a still image mode when said instructing means instructs generation of the still image signal, the mode signal being recorded by said recording means as a signal for discriminating the still image signal from the moving image signal.

5. A video signal recording apparatus according to claim 2, wherein said instructing means comprises means for setting the time period for generating the still image signal to an optional time period.

* * * * *

UNITED STATES PATENT AND TRADEMARK OFFICE
CERTIFICATE OF CORRECTION

PATENT NO. : 5,625,741  
DATED : April 29, 1997  
INVENTOR(S) : SABURO NAKAZATO

Page 1 of 2

It is certified that error appears in the above-identified patent and that said Letters Patent is hereby corrected as shown below:

Title page,

At [56] References Cited

U.S. PATENT DOCUMENTS:

Insert, --4,546,390  10/1985  Konishi et al.--.

FOREIGN PATENT DOCUMENTS:

Insert, --2-151185  6/1990  Japan--.

Drawings:

SHEET 3

Figure 3, "DEGITAL" should read --DIGITAL--.

COLUMN 1

Line 26, "TEE" should read --THE--.

UNITED STATES PATENT AND TRADEMARK OFFICE
CERTIFICATE OF CORRECTION

PATENT NO. : 5,625,741
DATED : April 29, 1997
INVENTOR(S) : SABURO NAKAZATO

It is certified that error appears in the above-indentified patent and that said Letters Patent is hereby corrected as shown below:

COLUMN 3

Line 10, "with" should read --in--.

COLUMN 4

Line 45, "signal" (second occurrence) should read --signal;--

Line 46, "and;" should read --and--.

Signed and Sealed this

Twenty-first Day of October 1997

Attest:

BRUCE LEHMAN

Attesting Officer    Commissioner of Patents and Trademarks